J. F. HORNE.
FILTER FOR MILK PAILS.
APPLICATION FILED JUNE 10, 1908.
919,431.
Patented Apr. 27, 1909.
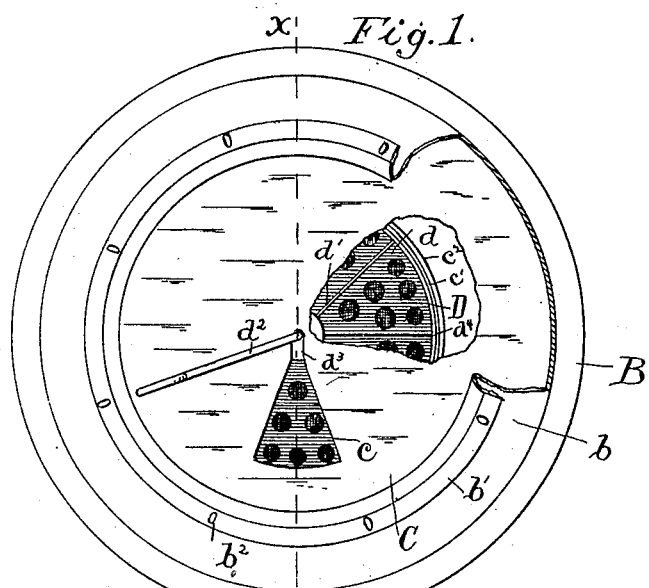
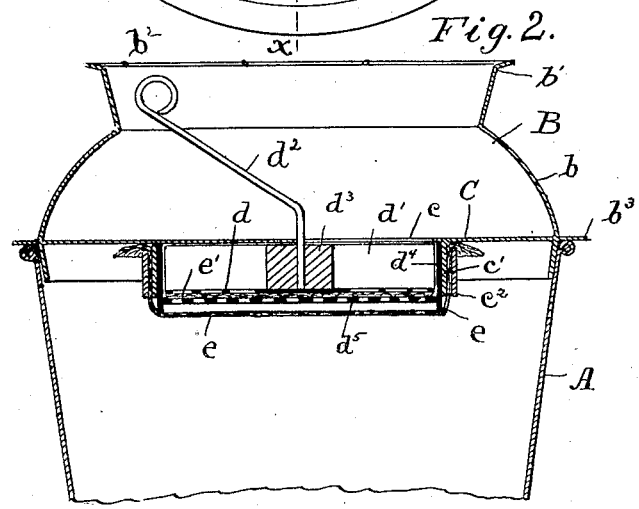
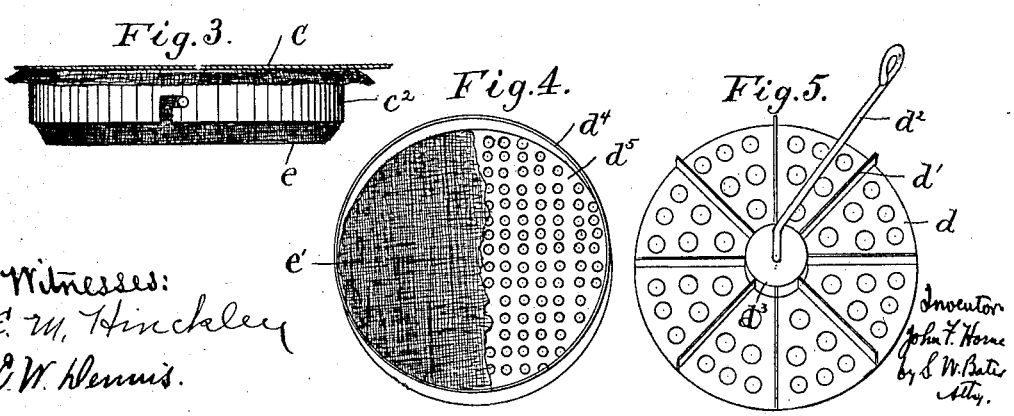
Witnesses:
E. M. Hinckley
O. W. Dennis
Inventor
John F. Horne
by S. W. Bates
Atty.
THE NORRIS PETERS CO., WASHINGTON, D. C.

UNITED STATES PATENT OFFICE.

JOHN F. HORNE, OF PORTLAND, MAINE, ASSIGNOR TO REVOLVING DAIRY FILTER COMPANY, OF PORTLAND, MAINE, A CORPORATION OF MAINE.

FILTER FOR MILK-PAILS.

No. 919,431.         Specification of Letters Patent.         Patented April 27, 1909.

Application filed June 10, 1908. Serial No. 437,630.

*To all whom it may concern:*

Be it known that I, JOHN F. HORNE, of Portland, in the county of Cumberland and State of Maine, have invented certain new and useful Improvements in Filters for Milk-Pails, of which the following is a specification.

My invention relates to a milking pail for receiving milk direct from the cow and the object of the invention is to construct a milking pail in which the milk will pass into the pail free from dirt and without straining through an objectionable mass of dirt.

In the ordinary milking pail even when it is provided with a receiving strainer, the dirt which falls into the strainer from the cow gradually accumulates into a mass of filth through which all the milk is obliged to pass. An objectionable and unsanitary condition is thus created resulting in contamination to the milk, injury to its flavor, etc. According to my invention, I remedy this difficulty by the use of a strainer divided into a plurality of operative sections or segments and so arranged that the milk passes through one section at a time and provided with means by which the stream of milk may be easily and quickly diverted from one operative section of the strainer to another either by making the strainer movable or otherwise.

In the form in which I have embodied my invention as hereinafter shown, the pail is divided into an open topped milk receiving chamber with an opening in the bottom for the passage of the milk into the pail proper and beneath said opening is pivoted a pervious strainer disk divided into segments by suitable partitions and adapted to be turned so that one segment at a time comes beneath the discharge opening. Thus when the dirt begins to accumulate in the section which is being used, the disk is rotated by means of a suitable handle to the next section which is clean and entirely free from dirt and so on until the milking is complete, the milk during all this time passing through a strainer which is comparatively free from dirt.

I illustrate my invention in the accompanying drawing which shows a milking pail provided with the device in its preferable form.

In the drawing, Figure 1 is a plan showing certain portions cut away, Fig. 2 is a section on the line $x$ $x$ of Fig. 1 looking toward the right and with the operating handle turned to the left, Fig. 3 is an elevation of the under side of the milk receiving chamber with the bottom of the same in section, Figs. 4 and 5 are details of parts of the strainer disk.

In the drawing, A represents the milk pail proper and B represents my straining device as a whole which is fitted into the top of the milk pail resting on a flange $b^3$. The straining device consists of an open top milk receiving chamber having a bottom provided with a relatively small opening.

As here shown, the open top of the chamber shown at $b'$ is annular in form, the bottom is composed of a horizontal diaphragm C and the sides $b$ are inclined from the bottom inward to the mouth or opening preferably with a curved or globular surface. As the result of this construction the milk, as it falls on the diaphragm C with the pail inclined as is usually the case in milking, will not spatter out of the opening but the overhanging sides of the chamber will confine the milk in its place.

An opening is made in the bottom of the chamber B for the passage or discharge of the milk into the pail proper and beneath this opening is the sectional or segmental strainer. As here shown, this sectional strainer is made in the form of a pervious disk divided into suitable segmental sections and an opening $c$ is provided in the diaphragm C and adapted to register in turn with each segment as the pervious disk is turned on its pivot. As herein illustrated, the pervious strainer disk is made up of a ring $d^4$ having a bottom formed of a diaphragm $d^5$ made of coarsely perforated metal. Within this ring is fitted a disk $d$ made up of coarsely perforated metal and provided with a series of radiating partitions $d'$, eight in number as here shown, extending outward from a central hub $d^3$ to the outer edge of the disk. These partitions $d'$ and the ring $d^4$ constitute the inclosing boundaries of the segments of the strainer disk and the opening $c$ is substantially the size of each of these segments.

Between the disk $d$ and the diaphragm $d^5$ a removable strainer cloth is placed and the whole structure constitutes the upper straining apparatus.

The strainer disk as described is confined adjacent to the under side of the diaphragm C by fitting within a ring or annular flange $c'$ secured to the under side of said diaphragm. The disk is provided with a handle or spindle $d^2$ which extends up through the diaphragm C and is bent laterally to a point adjacent to the annular mouth for the purpose of indicating the position of the disk. Division marks $b^2$ are made on the mouth for the purpose of setting the handle $d^2$ in the correct position so that the opening $c$ will register with one of segments of the strainer disk.

Provision is made for straining the milk a second time, namely, after it passes through the strainer disk described and for this purpose a strainer cloth $e$ is stretched over the flange $c'$ and secured in place by a ring $c^2$ secured by a bayonet joint or otherwise. The lower edge of the flange $c'$ is low enough so that there will be left a considerable space or chamber between the cloth $e$ and the diaphragm $d^5$ whereby the milk will have a chance to distribute itself after leaving the upper strainer.

In practical operation, the milk from the cow is directed into the milk receiving chamber B and passes down to the opening $c$, thence through the segment of the strainer disk which is beneath the opening $c$ and thence it passes through the lower strainer cloth into the pail. When any appreciable amount of dirt accumulates in the compartment beneath the opening $c$, the handle $d^2$ is turned until it comes opposite one of the marks $b^2$ on the mouth of the vessel, bringing a new segment of the filtering disk in operative position and this process is continued until the pail is filled, the entire amount of dirt being distributed through the whole number of apartments in the filtering disk. The use of this device insures milk which is substantially free from dirt and it is operated with little or no trouble to the person using it. When the strainer is to be cleaned, the ring $c^2$ is removed, the strainer cloth $e$ taken off, and the strainer disk slipped downward out of the ring $c'$, the handle passing down through the opening $c$. It is evident that a strainer having operative sections or segments adapted to be changed during the process of milking may be arranged otherwise than here shown and that many modifications of the device may be made without departing from the spirit of my invention.

I claim:—

1. The herein described milking pail having a milk receiving chamber a strainer divided into operative sections beneath said strainer and means for passing the milk through one of said sections at a time.

2. The herein described milking pail having a milk receiving chamber a laterally movable strainer beneath said strainer divided into a plurality of operative sections, means for passing the milk through one of said sections and for changing the position of said strainer to bring other sections into operative position.

3. The herein described milking pail having a milk receiving chamber an opening therein through which the milk passes into the pail, a strainer below said opening, said strainer and said opening being movable one with relation to the other to shift the operative surface of the strainer.

4. The herein described milking pail having an open topped milk receiving chamber with a discharge opening in the bottom thereof, a movable strainer below said opening and means for shifting the operative surface of said strainer.

5. The herein described milking pail having an open topped milk receiving chamber with a discharge opening in the bottom thereof, a strainer pivoted beneath said opening and adapted to be turned to shift the operative surface of the strainer.

6. The herein described milking pail having an open topped milk receiving chamber, a pervious disk pivoted beneath the bottom of said chamber, said disk being divided into straining sections by inclosing partitions, an opening being formed in said bottom to register with each of said sections in turn as said disk is rotated.

7. The herein described milking pail having an open topped milk receiving chamber, a pervious strainer disk pivoted beneath the bottom of said chamber said disk being divided into segmental sections by radial partitions, a segmental opening being formed in said bottom to register with each of said sections in turn as the disk is rotated.

8. The herein described milking pail having an open topped milk receiving chamber having an annular flange on the under side of the bottom thereof, a pervious strainer disk fitting within said flange divided into segmental sections by radial partitions and a peripheral flange, said disk having an operating spindle extending up through said bottom, a segmental opening being formed in said bottom to register with each of said sections as the disk is rotated.

9. The herein described milking pail having an open topped milk receiving chamber having an annular flange on the under side of the bottom thereof, a cloth binding ring fitting over said flange to secure a strainer cloth thereon, a pervious segmental strainer disk fitting inside of said flange and made up of a ring having a perforated metal diaphragm in its bottom, a perforated metal disk resting on said diaphragm, and adapted to confine a cloth strainer, an operating spindle extending up through the bottom of said chamber and radiating partitions resting on said perforated disk to divide said pervious strainer into segments, the bottom of said chamber having a segmental opening adapted to register with the segments of said strainer disk as the latter is rotated.

10. The herein described milking pail having an open topped milk receiving chamber, having an annular flange on the under side of the bottom thereof, a pervious segmental strainer disk fitting inside of said flange and made up of a ring having a perforated metal diaphragm in its bottom, a perforated metal disk resting on said diaphragm adapted to confine a cloth strainer, an operating spindle extending up through the bottom of said chamber and radiating partitions resting on said perforated disk to divide said pervious strainer into segments, the bottom of said chamber having a segmental opening adapted to register with the segments of said strainer disk as the latter is rotated.

11. The herein described milking pail having a milk receiving chamber with an annular open top or mouth, a segmental strainer disk pivoted beneath the bottom of said chamber having an operating handle extending up through said bottom and laterally toward said mouth to form an indicator, said bottom having a segmental opening to register with the segments of said strainer disk, and indicating marks on the said mouth for locating the position of said indicator to assure the registering of said opening and segments.

In testimony whereof I have affixed my signature, in presence of two witnesses.

JOHN F. HORNE.

Witnesses:
S. W. BATES,
ELEANOR W. DENNIS.